United States Patent
Cerretelli et al.

(10) Patent No.: US 7,128,082 B1
(45) Date of Patent: Oct. 31, 2006

(54) METHOD AND SYSTEM FOR FLOW CONTROL WITH FLUIDIC OSCILLATORS

(75) Inventors: Ciro Cerretelli, Niskayuna, NY (US); Kevin Richard Kirtley, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/201,914

(22) Filed: Aug. 10, 2005

(51) Int. Cl.
*F15C 1/08* (2006.01)
*B05B 1/08* (2006.01)

(52) U.S. Cl. .................. 137/14; 137/814; 137/826; 137/833; 239/589.1

(58) Field of Classification Search .............. 137/14, 137/814, 826, 833; 239/589.1
See application file for complete search history.

(56) References Cited

U.S. PATENT DOCUMENTS

| | | | | |
|---|---|---|---|---|
| 3,016,066 A | * | 1/1962 | Warren | 137/836 |
| 3,468,328 A | * | 9/1969 | Metzger | 137/815 |
| 3,805,614 A | * | 4/1974 | Walliser | 374/118 |
| 3,857,412 A | * | 12/1974 | Ringwall | 137/814 |
| 4,905,909 A | * | 3/1990 | Woods | 239/589.1 |
| 5,190,099 A | * | 3/1993 | Mon | 165/104.33 |
| 5,524,660 A | * | 6/1996 | Dugan | 137/14 |
| 5,893,383 A | | 4/1999 | Facteau | |
| 5,906,317 A | | 5/1999 | Srinath | |
| 6,240,945 B1 | * | 6/2001 | Srinath et al. | 137/14 |
| 6,805,164 B1 | | 10/2004 | Stouffer | |
| 2004/0020208 A1 | | 2/2004 | Knight | |

* cited by examiner

*Primary Examiner*—A. Michael Chambers
(74) *Attorney, Agent, or Firm*—Richard A. DeCristofaro; Patrick K. Patnode

(57) ABSTRACT

A system for control of a fluid flow. The system includes an array of fluidic oscillators. Each fluidic oscillator carries an oscillating flow of the fluid and includes a throat, an input port connected to the throat, two control ports connected to the throat and two output ports extending from the throat. A feedback line is connected to each of the two output ports and each of the two control ports. The system further includes a plenum connected to the input ports of the fluidic oscillators to supply the fluid to the fluidic oscillators and a feedback chamber disposed along each feedback line of each fluidic oscillator to provide a feedback path for the control fluid to cause oscillatory fluid motion between the first output port and the second output port, the frequency of which may be modulated by adjusting the volume of the feedback chamber.

51 Claims, 4 Drawing Sheets

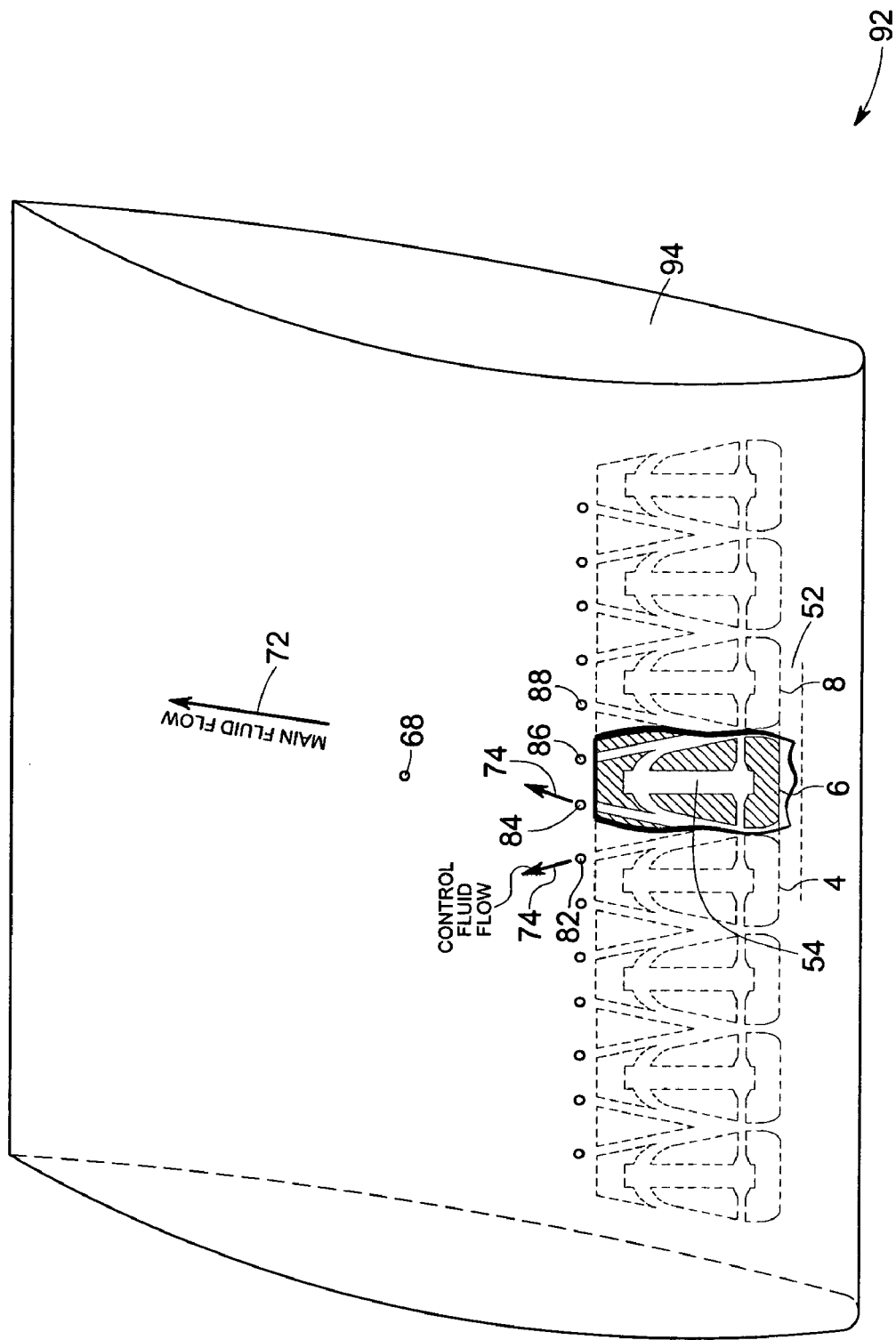

METHOD AND SYSTEM FOR FLOW CONTROL WITH FLUIDIC OSCILLATORS

BACKGROUND

Steady boundary layer blowing as a means to remove loss generating separated flow in gas turbine engines is well established. The source of the blowing flow comes from higher pressure regions of the engine or an auxiliary source. The extraction of this high-pressure flow results in a penalty on overall engine performance and efficiency. Prior art on control of boundary layer separation typically reports that the use of unsteady blowing reduces the necessary amount of mass required by steady blowing by factors ranging from 2 to about 100. A means of improving blowing efficiency is to introduce unsteady blowing through fluidic oscillators where a flow of fluid is pulsed without mechanical actuators into the boundary layer upstream of the separation point. However, the frequency, amplitude, and phase of the unsteadiness are critical to proper application of unsteady blowing for boundary layer control.

Therefore there is need of a method of implementing unsteady boundary layer injection using fluidic oscillators. In particular, there is a need for new techniques for operating unsteady fluidic oscillators that take into account the dynamics of the overall fluidic dynamic system.

BRIEF DESCRIPTION

Briefly, in accordance with one embodiment of the invention, there is provided a system for control of a main fluid flow. The system includes an array of fluidic oscillators. The array of fluidic oscillators includes at least one first fluidic oscillator. The at least one first fluidic oscillator includes a first throat, a first input port connected to the first throat, a first control port and a second control port connected to the first throat, a first output port and a second output port extending from the first throat, a first feedback line connected to the first output port and the first control port and a second feedback line connected to the second output port and the second control port. The system also includes a plenum connected to the first input port of the at least one fluidic oscillator to supply the control fluid to the at least one fluidic oscillator. The system further includes a first feedback chamber disposed along the first feedback line of the at least one fluidic oscillator and a second feedback chamber disposed along the second feedback line of the at least one fluidic oscillator to provide a feedback path for the control fluid to cause oscillatory fluid motion between the first output port and the second output port.

In accordance with another embodiment of the invention, there is provided a method for controlling a main fluid flow. The method includes positioning an array of fluidic oscillators. The array of fluidic oscillators includes at least one fluidic oscillator carrying an oscillating flow of a fluid. The at least one fluidic oscillator includes a first throat, a first input port connected to the first throat, a first control port and a second control port connected to the first throat, a first output port and a second output port extending from the first throat, a first feedback line connected to the first output port and the first control port and a second feedback line connected to the second output port and the second control port. The method also includes connecting a plenum to the first input port of the at least one fluidic oscillator to supply the control fluid to the at least one first fluidic oscillator. The method further includes disposing a first feedback chamber along the first feedback line of the at least one fluidic oscillator and a second feedback chamber along the second feedback line of the at least one fluidic oscillator to provide a feedback path for the control fluid to cause oscillatory fluid motion between the first output port and the second output port.

DRAWINGS

The foregoing and other advantages and features of the invention will become apparent upon reading the following detailed description and upon reference to the drawings in which:

FIG. 4 is a schematic view of an array of fluidic oscillators deployed in a gas turbine blade in accordance with an exemplary embodiment of this invention.

DETAILED DESCRIPTION

Figure 1:
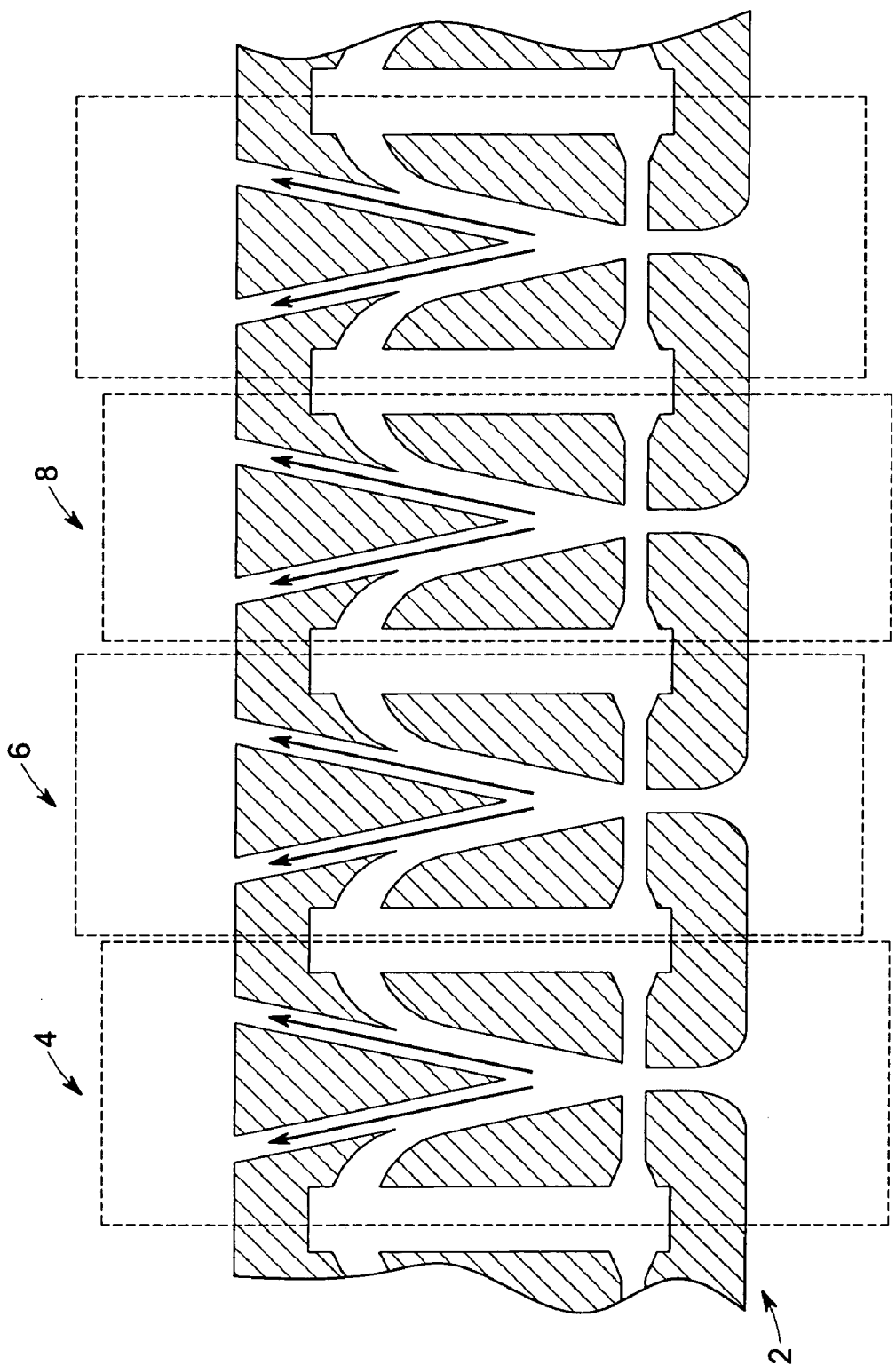
FIG. 1 is diagrammatical view of an array of fluidic oscillators.

FIG. 1 is diagrammatical view of an array 2 of fluidic oscillators positioned in a gas turbine engine in accordance with an exemplary embodiment of this invention. The cross section of the array 2 of fluidic oscillators is taken along the axis of the gas turbine engine. The array of fluidic oscillators 2 includes an exemplary first fluidic oscillator 4, an exemplary second fluidic oscillator 6, an exemplary third fluidic oscillator 8 and so on. Details of two exemplary oscillators 4 and 6 are illustrated in FIG. 2.

Figure 2:
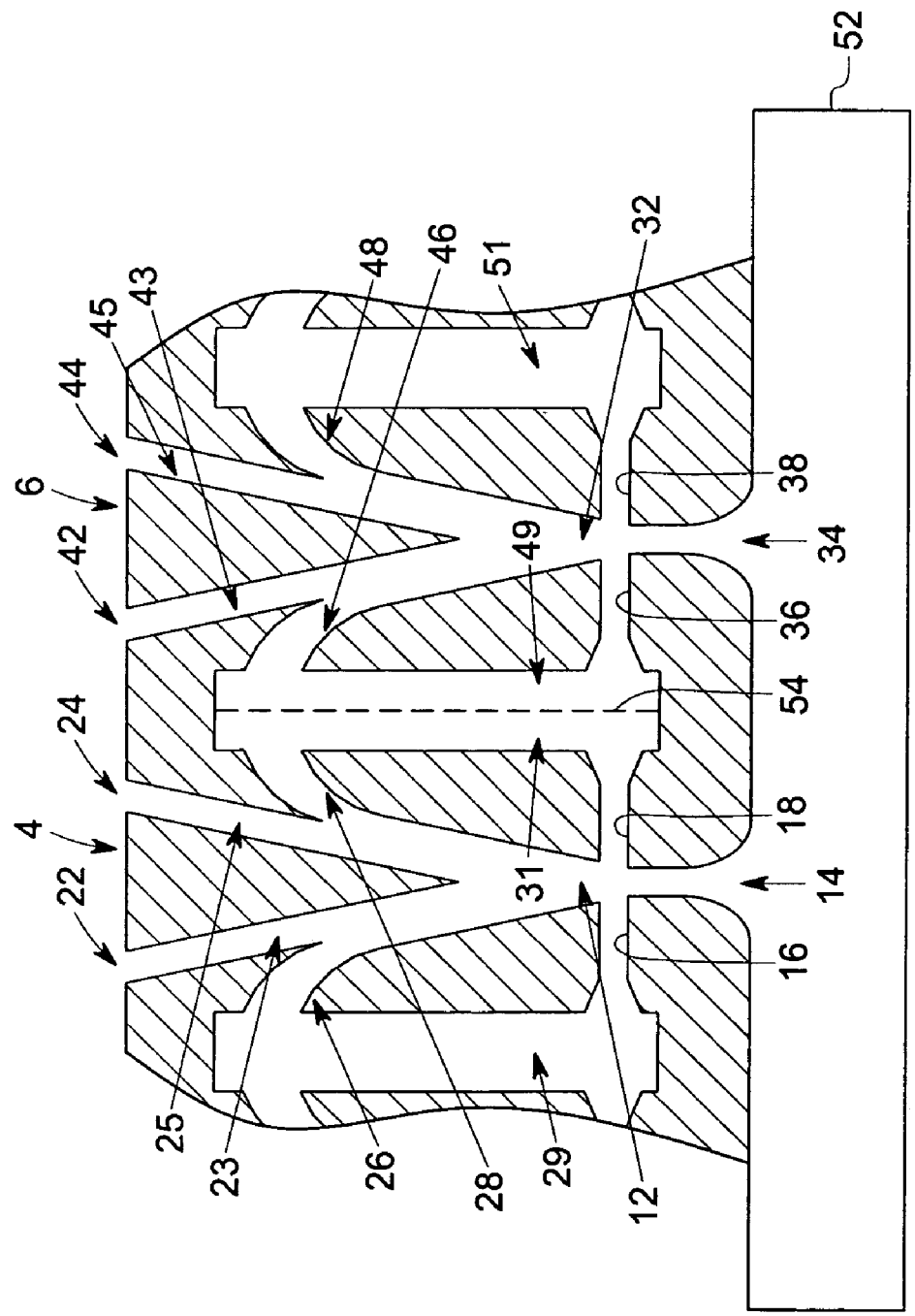
FIG. 2 is a diagrammatical view of an exemplary first fluidic oscillator and an exemplary second fluidic oscillator forming part of an array of fluidic oscillators.

FIG. 2 is a diagrammatical view of an exemplary first fluidic oscillator 4 and an exemplary second fluidic oscillator 6 positioned in a gas turbine engine in accordance with an exemplary embodiment of this invention. The gas turbine engine carries a flow of a main fluid and the first fluidic oscillator 4 and the second fluidic oscillator 6 each carry a flow of a control fluid. The first fluidic oscillator 4 includes a first throat 12, and a first input port 14, a first control port 16 and a second control 18 port—each connected to the first throat 12. The first fluidic oscillator 4 also includes a first output port 22 and a second output port 24 connected to the first throat 12 by first output channel 23 and second output channel 25 respectively. The first fluidic oscillator 4 further includes a first feedback line 26 connecting the first output channel 23 with a first feedback chamber 29 and a second feedback line 28 connecting the second output channel 25 with a second feedback chamber 31. In a like manner, the second fluidic oscillator 6 includes a second throat 32 and a second input port 34, a third control port 36 and a fourth control port 38, each connected to the second throat 32. The second fluidic oscillator 6 also includes a third output port 42 and a fourth output port 44 connected to the second throat 32 by third output channel 43 and fourth output channel 45 respectively. The second fluidic oscillator 6 further includes a third feedback line 46 connecting the third output channel 43 with the third feedback chamber 49 and a fourth feedback line 48 connecting the fourth output channel 45 with the fourth feedback chamber 51.

The array 2 of fluidic oscillators also includes a common plenum 52 connected to the first input port 14 of the first fluidic oscillator 4 and to the second input port 34 of the second fluidic oscillator 6 to supply the control fluid to the first fluidic oscillator 4 and the second fluidic oscillator 6. The array 2 of fluidic oscillators further includes a shared feedback chamber 54 formed by fusing the second feedback chamber 31 of the first fluidic oscillator 4 with the third feedback chamber 49 of the second fluidic oscillator 6. By this arrangement, the second feedback line 28 of the first fluidic oscillator 4 and the third feedback line 46 of the second oscillator 6 supply the control fluid into the shared feedback chamber 54. The shared feedback chamber 54 thus provides a feedback flow path for the control fluid to the first fluidic oscillator 4 and the second fluidic oscillator 6 and thereby puts the first fluidic oscillator 4 in fluidic communication with the second fluidic oscillator 6.

Referring to FIG. 2 again, structurally, the fluidic oscillator 4 taken as a matter of illustration is constituted by a fluidic flip-flop diverter mechanism, where the control fluid is blown from the input port 14 onto a wedge formed between the two bifurcating output channels 23 and 25 that open to the environment through the output ports 22 and 24 respectively. Owing to the wall attachment phenomenon, commonly known as Coanda effect, the flow of the control fluid diverts to either one of the two output ports 22 and 24. By applying proper pressure to the control ports 16 and 18 it is possible to divert the flow of the control fluid to the other output port, and vice versa. In a like manner, in case of the second fluidic oscillator 6, the flow of the control fluid may be made to flow in to either one of the two output ports 42 and 44 first and then in to the other by applying proper pressure to the control ports 36 and 38. Since the fluidic oscillators are symmetrical, on steady state, the change in direction of the control fluid flow through the two output ports of each fluidic oscillator is sustained at some frequency. Through proper design, the fluidic oscillators 4, 6, 8 and so may be made to emit alternating pulse of flow from each of the output ports at a certain desired frequency.

In an exemplary embodiment of this invention, when the shared feedback chamber 54 is formed by fusing the second feedback chamber 31 of the first fluidic oscillator 4 is fused with the third feedback chamber 49 of the second fluidic oscillator 6, the change in direction of the control fluid in the two output ports 22 and 24 of the first fluidic oscillator 4 for instance is self-sustained. At the same time, the change in direction of the control fluid in the two output ports 42 and 44 of the second fluidic oscillator 6 may also be made self-sustained. Moreover, the fluidic oscillators 4 and 6 are interconnected by the shared feedback chamber 54 and they communicate with the shared feedback chamber 54 through their respective feedback lines 26, 28 and 46, 48. This way, the fluidic oscillators 4 and 6 operate in a frequency-locked manner and the flow of the control fluid in the output ports 22 of fluidic oscillator 4 is synchronized with the flow of the control fluid in the output ports 44 of fluidic oscillator 6. In a like manner, the flow of the control fluid in the output ports 24 of fluidic oscillator 4 and the output ports 42 of fluidic oscillator 6 are also synchronized. To elaborate further, in one embodiment of the invention, the first output port 22 and fourth output port 44 operate in phase. In a like manner, the second output port 24 and the third output port 42 may operate in phase. Moreover, the first pair of the first output port 22 and the fourth output port 44 may operate out of phase with the second pair of the second output port 24 and the third output port 42 by a predetermined angle. The fluidic oscillators 4 and 6, thus generate two coherent output streams of control fluid pulsating at a predetermined angle of phase difference with each other. In one embodiment of the invention, the predetermined angle may be 180 degrees.

The operational logic extends to the operation of the second fluidic oscillator 6 and the third fluidic oscillator 8, when considered together. The array 2 of fluidic oscillators 4, 6, 8 and so on thus becomes a flip-flop mechanism in an operational sense where a number of sets of output ports 22, 44 and 24, 42 and so on generate pulsating flow at a predetermined angle of phase difference with one another. Referring to FIG. 2 again, all the single fluidic oscillators 4, 6, 8 and so on are supplied by the same common plenum 52 and are directly connected to a series of shared feedback chambers such as 54. Therefore the pulsating jets coming out of the output ports of the fluidic oscillators 4, 6, 8 and so on have their frequency of pulsation locked so that they form an array 2 of multiple coherent fluidic oscillators.

In operation, the array 2 of fluidic oscillators, in one instance is intended to control a boundary layer flow of the main fluid flow in a gas turbine engine by means of an addition of momentum of the oscillating flow of the control fluid from the first, second, third and fourth output ports 22, 24, 42, 44 and so on to the boundary layer. Throughout this description, the terms 'main flow' and 'primary flow' are used interchangeably to refer to the fluid flow in the gas turbine that the array 2 of fluidic oscillators intended to stabilize.

Through the present discussion, it should be noted that the present invention may be utilized with various types of applications where fluid control and prevention of boundary layer separation is important. By way of example and not limitation, the invention is described herein as it may be applied to turbo machinery vanes and passages or engine components or fluidic logic circuitry. The described systems, assemblies, and methods use injection of high-energy air into the boundary layer of the flow in a gas turbine engine to forestall the onset of boundary layer separation.

A typical gas turbine engine operates by compressing a flow of air entering the engine, adding fuel to the compressed airflow, burning the fuel/air mixture in a combustor, and then expanding the flow from the combustor through one or more turbines. Such gas turbine engines may be used to provide thrust via the expulsion of the exhaust gases, to provide mechanical power by rotating a shaft connected to one of the turbines, or to provide a combination of thrust and mechanical power. For instance, the compressor on the upstream side of the engine is generally powered by a shaft driven by one or more of the turbine stages of the engine positioned downstream.

Figure 3:
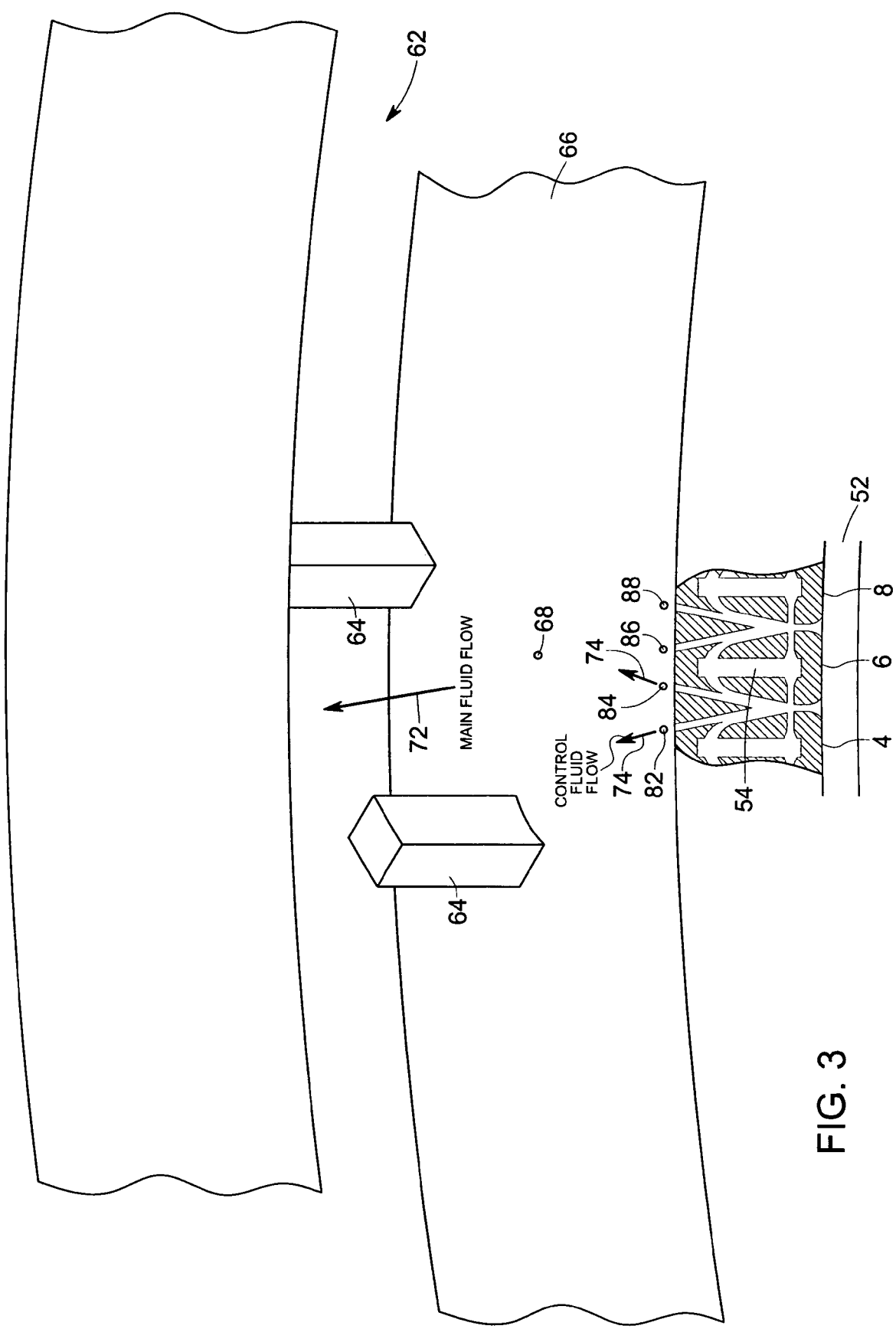
FIG. 3 is a schematic view of an array of fluidic oscillators deployed in a gas turbine engine in accordance with an exemplary embodiment of this invention.

FIG. 3 is a schematic view of an array 2 of fluidic oscillators deployed in a gas turbine engine 62 in accordance with an exemplary embodiment of this invention. There are a number of rotors 64 positioned within the space bounded by the interior wall 66 of the gas turbine engine 62. There is an exemplary point 68 on the interior wall 66 where a boundary layer may get separated when a main fluid flow 72 passes through the gas turbine engine 62. In accordance with one embodiment of the invention, in order to inhibit separation of a boundary layer in the main fluid flow 72 of the gas turbine engine 62, flow of a control fluid 74 may be injected upstream of the potential separation point 68 by a special deployment of the fluidic oscillators 4, 6, 8 and so on described above. In one embodiment of the invention, there are a number of holes 82, 84, 86 and 88 arranged circumferentially and bored on the interior wall 66 of the gas turbine engine 62. The fluidic oscillators 4, 6, 8 and so on are so deployed that each of the output ports 22, 24, 42, 44 match with one of the holes 82 or 84 or 86 or 88 and so on. Thus when in operation, the fluidic oscillators 4, 6, 8 and so on may receive a steady stream of control fluid 74 at their common plenum 52 from typical auxiliary sources and in turn, allow flow the control fluid 74 into the gas turbine engine 62 through the holes 82, 84, 86, 88 and so on. The holes 82, 84, 86, 88 and so on thus form an array of holes that is coherently emitting pulsating jets of the control fluid 74 in to a boundary layer flow of the main fluid 72 in the gas turbine engine 62.

In one exemplary embodiment of the invention, the control fluid used in the fluidic oscillators 4, 6 or 8 may be air and the air may be typically supplied from a number of auxiliary sources such as a compressor, a turbine, a turbine bypass, an auxiliary pump and the like. The source of air may be further designed to control the flow of the air to achieve a predetermined air-to-fuel ratio in the combustor. The predetermined air-to-fuel ratio facilitates reduction of lean-blowout flame temperature of a flame in the combustion zone. Moreover, in one embodiment of the invention, the predetermined air-to-fuel ratio facilitates reduction of emissions of noxious substances in an exhaust from the gas turbine engine 62.

Referring to FIG. 3 once more, the first oscillator 4 and the second oscillator 6 in an exemplary instance inhibit separation of boundary layer of the main fluid flow 72 in the gas turbine engine 62. More specifically, the separation of the boundary layer is inhibited by addition of momentum caused by the addition of the flow of control fluid 74 coming through the output ports of the fluidic oscillators and by the unsteady mixing produced by the oscillating output jets. In one embodiment of the invention, the introduction of the control flow occurs at a point 68 in the main fluid flow upstream of a separation point where the separation of the fluid flow would have occurred without the control flow.

Referring to FIG. 3 again, in one embodiment of the invention, the frequency of oscillation of the control fluid may be functionally related to the volume flow rate of the control fluid through the shared feedback chamber 54. In this configuration of the fluidic oscillators, the frequency of oscillation of the control fluid may be controlled by changing a volume of the shared feedback chamber 54. The frequency increases when the volume of the feedback chamber 54 is reduced and the frequency decreases when the volume of the feedback chamber is increased. In another embodiment of the invention, the frequency of oscillation in the fluidic oscillators 4, 6, 8 and so on may be tuned to a shedding frequency of vortices in a separated boundary layer of the fluid flow by changing the volumes in the feedback chambers such as 54 as will be explained later. The frequency of oscillation in the fluidic oscillators may be further tuned for the various other specific applications according to the requirement dictated by pre-existing steady blowing applications. In one typical such application, the fluidic communication between the first oscillator and the second oscillator may control a functional relationship between a supply pressure from an external source of the control fluid flow and the frequency of oscillation of the fluid flow in the fluidic oscillator.

In one embodiment of the invention, the relatively small size of the fluidic oscillators 4, 6, 8 and so on allow implementation in narrow vanes and passages. In yet another embodiment of the invention, the fluidic oscillators may be embedded in turbo machinery blades. FIG. 4 illustrates a schematic view 92 of an array of fluidic oscillators deployed in a turbine blade 94 of a gas turbine engine in accordance with an exemplary embodiment of this invention. It will be understood by those of skill in the art that the illustrated blade 94 need not be a turbine blade, but may also be a stator blade, guide vane, compressor blade, or any similar structure as is found in a gas turbine engine or other turbo machinery. The array of fluidic oscillators 4, 6, 8 are shown disposed spanwise along the blade 94, but as noted above, could be disposed in other arrangements as well without departing from the spirit of this invention.

As shown in the embodiments illustrated in FIG. 3 and FIG. 4, there is an exemplary point 68 on the wall of the turbine blade 94 where a boundary layer may get separated when a main fluid flow 72 passes over the gas turbine blade 94. In accordance with one embodiment of the invention, in order to inhibit separation of a boundary layer in the main fluid flow 72 over the gas turbine blade 94, flow of a control fluid 74 may be injected upstream of the potential separation point 68 by special deployment of the fluidic oscillators 4, 6, 8 and so on described above. In one embodiment of the invention, there are a number of holes 82, 84, 86 and 88 arranged circumferentially and bored on the wall of the gas turbine blade 94. The fluidic oscillators 4, 6, 8 and so on are so deployed that each of the output ports 22, 24, 42, 44 match with one of the holes 82 or 84 or 86 or 88 and so on. Thus when in operation, the fluidic oscillators 4, 6, 8 and so on may receive a steady stream of control fluid 74 at their common plenum 52 from typical auxiliary sources and in turn, allow flow the control fluid 74 over the gas turbine blade 94 through the holes 82, 84, 86, 88 and so on. The holes 82, 84, 86, 88 and so on thus form an array of holes that is coherently emitting pulsating jets of the control fluid 74 in to a boundary layer flow of the main fluid 72 in the gas turbine blade 94.

In one embodiment of the invention, the fluidic oscillators 4, 6, 8 and so on used in the gas turbine engine application mentioned above may be passive oscillators. Passive oscillators will be explained in more details below. Steady boundary layer blowing in traditional applications feeds air taken from high-pressure sources into the interior wall carrying the flow at a potential separation point of the flow. When applied to gas turbine engines, the extraction of this high-pressure air results in a penalty on overall engine performance and efficiency, it is necessary to implement boundary layer injection as efficiently as possible and minimize the flow requirements in order to achieve a net positive impact on engine performance. A means to improve injection efficiently is unsteady blowing where air is pulsed into the boundary layer upstream of the separation point. In a typical instance, the use of unsteady blowing to prevent separation of boundary layer proved to reduce the necessary amount of mass required by steady blowing by factors ranging from 2 to about 100.

Traditionally rotary valves, solenoid valves and siren valves can be used for unsteady blowing. They are active oscillators and they typically include a number of moving parts. Such active oscillators may not be durable enough for engine applications owing to reliability and operability issues associated with the active unsteady oscillators. The multiple coherent fluidic oscillators 4, 6, 8 and so on described in relation to FIG. 1 and FIG. 2 above on the other hand are passive oscillators. The fluidic oscillators 4, 6, 8 and so on, as described above, are able to generate pulsating flow of the control fluid without employing any moving parts and therefore avoid many reliability and operability issues typically associated with many of the active oscillators. Not having any moving part also limits the pressure losses in the fluid flow due to friction in the fluidic oscillators 4, 6, 8 and so on. In a typical instance, output velocities of the control fluid coming out through the output ports of the fluidic oscillators 4, 6, 8 and so on may be about 80% of ideal lossless orifice velocity. Furthermore, traditional active oscillators may not work well in high temperature regions of an engine downstream of the low pressure compressor because the constitutive parts may melt or change their mechanical characteristics or moving parts may suffer associated issues such as non-uniform expansion that can bind bearings and the like. The traditional active oscillators are thus not very robust and thereby may not be very suitable for typical flow stabilizing applications in high temperature and high vibration environment. The passive fluidic oscillators 4, 6, 8 and so on when deployed in a gas turbine engine in accordance with one embodiment of the invention, may be designed to withstand and operate in a fluid flow region with high temperatures in a gas turbine engine operation by using the same heat resistant materials.

Coherent arrays of fluidic oscillators as described herein are not limited to the above described structure of the individual fluidic oscillators. In one embodiment of the invention, all or some of the fluidic oscillators may be independently operable and independently configurable. In one such instance, a typical independent fluidic oscillator includes a first throat, a first input port connected to the first throat, a first control port and a second control port connected to the first throat, a first output port and a second output port extending from the first throat, a first feedback line connected to the first output port and the first control port and a second feedback line connected to the second output port and the second control port. In addition to the general structure described above, one such typical independent fluidic oscillator also includes a plenum connected to the first input port to supply the control fluid. A typical independent fluidic oscillator also includes a feedback chamber disposed along each of the two feedback lines to provide a feedback path for the control fluid to cause oscillatory fluid motion between the first output port and the second output port. The frequency of oscillation of the control fluid may be controlled by varying the volume of the feedback chambers.

In a jet of control fluid that typically exits from a conduit to a surrounding medium of another fluid, sudden increase of the mass-flow leads to formation of well-defined vortices that dominate the boundary between the control fluid and the surrounding main fluid. Because these vortices help redistribute momentum over a large distance, the rate of turbulent mixing between the control fluid and the main fluid is closely linked to the dynamics of these vortices. One way to manipulate the dynamics of vortices is to modulate periodically the instantaneous mass-flux of the jet. This way, in one embodiment of the invention, the frequency and amplitude of oscillation of the control fluid may also be influenced by the driving pressure of the control fluid. The driving pressure of the control fluid and the volumes of the feedback chambers may typically be varied independently to deliver the required amplitude and frequency for optimum boundary layer control.

The application of the fluidic oscillators described in FIG. 1, FIG. 2, FIG. 3 and FIG. 4 above is not limited to the above described gas turbine engines. In another instance, the combustion characteristics of a typical enclosed combustor of a gas turbine engine, including flammability limits, instability, and efficiency, are closely related to the interaction between shear flow dynamics of the fuel and air flow at the inlet and acoustic modes of the combustor. Strong interaction between the acoustic modes of the combustor and the airflow dynamics may lead to highly unstable combustion. Specifically, unstable combustion may occur when the acoustic modes of the combustor match the instability modes of the airflow. For such conditions, the shedding of the airflow vortices upstream of the combustor tends to excite acoustic resonances in the combustion chamber, which subsequently cause the shedding of more coherent energetic vortices at the resonant frequency. The continued presence of such vortices provides a substantial contribution to the instability of the combustion process.

Thrust augmenters in gas turbine applications typically burn fuel to create additional thrust downstream of the turbo machinery in an aircraft engine. The natural combustion process is a dynamic process wherein unsteady heat release can generate acoustic resonances that destabilize the combustion process and can lead to catastrophic failure of the augmenter through fatigue. Typically, to avoid combustion instabilities, after-burning augmenter operation is limited to engine conditions where possibility of occurrence of such combustion instabilities is low. Such restriction in operation leads to a reduced operability of the aircraft employing the engine augmenter. Fuel modulation and other techniques commonly known in prior art have not resulted in satisfactory performance. Use of fluidic oscillators, however, as illustrated in one embodiment of this invention to add air jets pulsating at a known frequency into the combustion region of an after-burning thrust augmenter may reduce the combustion instabilities and thereby improve the performance of the engine. Moreover, such frequency-locked pulsating flow in the neighborhood of a combustion zone may stabilize the combustion process at a certain operating parameter depending on the pulsating frequency of the fluidic oscillators and thereby suppress various combustion instabilities. To be more specific, suppression of the combustion instabilities in the combustion zone this way may increase operability and life of various engine parts in a gas turbine engine.

In one embodiment of the invention, the fluidic oscillators 4, 6, 8 and so on may be employed in the flame-holder of an aircraft engine after-burning thrust augmenter to suppress combustion instabilities such as one mentioned above. Structurally, array 2 of the fluidic oscillators may be positioned within the flame holder or heat shield of an augmenter to introduce pulses of higher momentum air at a known frequency into the combustion zone. In another embodiment of the invention, the array 2 of fluidic oscillators 4, 6, 8 and so on may be embedded into the flame holder and/or heat shield of an after-burning thrust augmenter. The oscillator exhaust may be exposed to the combustion zone behind the flame holder or the stabilizing regions behind the heat shield. The frequency of pulsation of the fluidic oscillators 4, 6, 8 and so on may be designed to limit the combustion to a desire fixed intensity and thereby to suppress undesired natural combustion instabilities.

In yet another embodiment of the invention, an array of oscillators located in each flame holder and disposed around the circumference of the augmenter or at various radial locations may regulate variations in local static pressure. Any change in local static pressure may in turn change the local flow rates through the oscillator. Distributing the fluidic oscillators radially and circumferentially inside a gas turbine engine in a designed manner may thereby provide a means to naturally control circumferential and radial instability modes in the gas turbine engine by controllably reducing the dynamic pressure amplitude of the main fluid at multiple flame pressure oscillation frequencies.

In another embodiment of the invention, the fuel-to-air ratio in a typical gas turbine engine may be controlled by adding a controllable auxiliary source of air, in order to control the size and orientation of the combustion zone. The fluidic oscillators if used appropriates, may produce discrete pressure pulses through the generation of periodic flame kernels by spark ignition of the air and fuel mixture. The flame kernels thus produced, may propagate in an outward and downstream direction and are subsequently released into the airflow. As the flame kernels propagate toward the combustion chamber, they also release a predetermined quantity of energy into the airflow. This release of energy is dependent on the quantity of fuel injected, and the timing and energy input from the fluidic oscillators. The result is a series of intentionally generated large scale vortices within the combustion chamber which ultimately affect the mixing of the air and fuel to alter the combustion process.

As discussed above, the fuel and air mixture that is injected at a particular location at the initiation of the vortex roll-up as well as the combustion may be regulated by adjusting the orientation and other mechanical design parameters of the fluidic oscillators. Moreover, the timing of injection of air or fuel also may be achieved by modulating the fuel and air mixture with the fluidic oscillators, or by synchronizing the fuel regulator with the fluidic oscillators. In addition to liquid fuels that are generally used in gas turbine engines, gaseous fuels may also be used with the techniques described herein. This way, in one embodiment of the invention, the orientations of the output ports of the fluidic oscillators may be designed to control a location of the combustion zone within the afterburner or the thrust augmenter. In another embodiment of the invention, the orientations of the output ports of the fluidic oscillators may be designed to control the extent of spread of the combustion zone.

As mentioned above, in one exemplary embodiment of the invention, where the fluidic oscillators are used to control combustion instabilities, the control fluid used may be air. The air as control fluid may be typically supplied from an auxiliary source, such as a compressor, a turbine, a turbine bypass, an auxiliary pump and the like. The auxiliary source of air typically feeds the input ports of the fluidic oscillators. The auxiliary source of air may be further designed to control the flow of the air to achieve a predetermined air-to-fuel ratio in the combustion zone. Maintaining this predetermined air-to-fuel ratio may facilitate reduction of lean-blowout of flames in the combustion zone. Moreover the predetermined air-to-fuel ratio facilitates reduction of emissions of noxious substances in the exhaust from the engine.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed:

1. A method of controlling a main fluid flow comprising:
    positioning an array of fluidic oscillators, comprising:
        a first fluidic oscillator carrying an oscillating flow of a control fluid, comprising:
            a first throat,
            a first input port connected to said first throat,
            a first control port and a second control port connected to said first throat,
            a first output port and a second output port extending from said first throat,
            a first feedback line connected to said first output port and said first control port and
            a second feedback line connected to said second output port and said second control port;
    connecting a plenum to said first input port to supply said control fluid to said first fluidic oscillator;
    disposing a first feedback chamber along said first feedback line and a second feedback chamber along said second feedback line to provide a plurality of feedback paths for said control fluid to cause oscillatory fluid motion between said first output port and said second output port; and
    varying the volume of said first feedback chamber and the volume of said second feedback chamber to achieve a desired frequency of oscillation.

2. The method according to claim 1 further comprising increasing said frequency by reducing said volume of said first feedback chamber and decreasing said frequency by increasing said volume of said first feedback chamber.

3. The method according to claim 1, wherein varying comprises varying the volume of said first feedback chamber and the volume of said second feedback chamber uniformly.

4. The system according to claim 1 further comprising:
    positioning a second fluidic oscillator carrying an oscillating flow of said control fluid, said second fluidic oscillator comprising:
        a second throat,
        a second input port connected to said second throat,
        a third control port and a fourth control port connected to said second throat,
        a third output port and a fourth output port extending from said second throat,
        a third feedback line connected to said third output port and said third control port and
        a fourth feedback line connected to said fourth output port and said fourth control port;
    connecting said plenum to said second input port to supply said control fluid to said second fluidic oscillator;
    disposing the first feedback chamber along said third feedback line of to provide a feedback path for said control fluid to said second fluidic oscillator, wherein said first fluidic oscillator is in fluidic communication with said second fluidic oscillator through said first feedback chamber;
    blowing said input control fluid into said plenum for distribution into said array; and
    pulsating said output flow of said control fluid.

5. The method according to claim 4, wherein said blowing comprises:
    blowing said control fluid from said first throat onto a first wedge disposed between said first output port and said second output port of said first oscillator;
    blowing said control fluid from said second throat onto a second wedge disposed between said third output port and said fourth output port of said second oscillator; and
    stabilizing said flow of control fluid into said first output port, said second output port, said third output port and said fourth output port.

6. The method according to claim 4, wherein said pulsating comprises:
    applying pressure to said first control port of said first oscillator and said third control port of said second oscillator;
    re-circulating said flow of said control fluid in said feedback line;
    inducing an expansion wave by said flow of said control fluid;
    sending said expansion wave to said second control port of said first oscillator and said fourth control port of said second oscillator;
    creating an over-pressure of said flow of said control fluid;

increasing said over-pressure to reach a predetermined threshold;

switching direction of said flow of said control fluid;

diverting said flow of said control fluid to second output port of said first oscillator and said fourth output port of said second oscillator;

connecting said first and second control ports of said first oscillator and said third and fourth control ports of said second oscillator in a feedback loop;

sustaining automatically said switching direction of said flow of said control fluid.

7. The method according to claim 6, wherein said sustaining automatically comprises frequency-locking said first output port, said second output port, said third output port and said fourth output with each other.

8. The method according to claim 7 further comprising varying volume of said first feedback chamber to achieve said frequency.

9. The method according to claim 8 further comprising tuning said frequency to a shedding frequency of vortices in a separated boundary layer of said main fluid flow.

10. The method according to claim 4 further comprising controlling said fluidic communication between said first oscillator and said second oscillator to control a functional relationship between a supply pressure from an external source of said control fluid flow and said frequency.

11. The method according to claim 4, wherein said first oscillator and said second oscillator comprise passive oscillators.

12. The method according to claim 4, wherein said main fluid flow comprises a fluid flow downstream of a combustor.

13. The method according to claim 4, wherein said main fluid flows through at least one element selected from a group consisting of turbo machinery vanes and passages, engine components, fluidic logic circuitry, and any combination thereof.

14. The method according to claim 4 further comprising inhibiting separation of a boundary layer of said main fluid flow.

15. The method according to claim 14, wherein said inhibiting comprises inhibiting by addition of momentum to the boundary layer by means of said oscillating flow of said control fluid from said first, second, third and fourth output ports.

16. The method according to claim 15, wherein said addition of said momentum occurs at a point in said main fluid flow upstream of a separation point where said separation of said boundary layer of said main fluid flow would have occurred without said addition of momentum.

17. The method according to claim 15, wherein said inhibiting comprises promoting unsteady mixing in the boundary layer by the oscillating flow of said control fluid.

18. The method according to claim 4, wherein said array of fluidic oscillators is positioned inside at least one element of an after-burning thrust augmenter selected from a group consisting of a flame holder, a heat shield, and any combination thereof.

19. The method according to claim 18 further comprising suppressing combustion instabilities in a combustion zone within said at least one element.

20. The method according to claim 18, wherein said control fluid is air.

21. The method according to claim 20 further comprising disposing a source of said air to supply said air into said plenum, wherein said source comprises at least one element selected from a group consisting of a compressor, a turbine, a turbine bypass, an auxiliary pump, and any combination thereof.

22. The method according to claim 21 further comprising controlling said flow of said air to achieve a predetermined air-to-fuel ratio in said combustion zone.

23. The method according to claim 22, wherein said predetermined air-to-fuel ratio facilitates elimination of lean-blowout of a flame in said combustion zone.

24. The method according to claim 22, wherein said predetermined air-to-fuel ratio facilitates reduction of emissions of noxious substances in an exhaust from said combustion zone.

25. The method according to claim 18 further comprising orienting said first output port, said second output port, said third output port and said fourth output port to control a location of said combustion zone.

26. The method according to claim 18 further comprising orienting said first output port, said second output port, said third output port and said fourth output port to control an extent of spread of said combustion zone.

27. The method according to claim 18 further comprising controlling circumferential and radial instability modes of combustion within said combustion zone.

28. A system for control of a main fluid flow, comprising:
a first fluidic oscillator carrying an oscillating flow of a control fluid, comprising:
a first throat,
a first input port connected to said first throat,
a first control port and a second control port connected to said first throat,
a first output port and a second output port extending from said first throat and in fluid communication with a main fluid flow,
a first feedback line connected to said first output port and said first control port and
a second feedback line connected to said second output port and said second control port;
a plenum connected to said first input port of said first fluidic oscillator to supply said control fluid to said first fluidic oscillator; and
a first feedback chamber disposed along said first feedback line and a second feedback chamber disposed along said second feedback line to provide a plurality of feedback paths for said control fluid to cause oscillatory fluid motion between said first output port and said second output port, wherein volume of said first feedback chamber and volume of said second feedback chamber may be varied to achieve a desired frequency of oscillation.

29. The system according to claim 28, wherein said volume of said first feedback chamber and said volume of said second feedback chamber may be varied uniformly.

30. The system according to claim 28 wherein said frequency increases when said volume of said first feedback chamber is reduced and said frequency decreases when said volume of said first feedback chamber is increased.

31. The system according to claim 28 further comprising:
a second fluidic oscillator carrying an oscillating flow of said control fluid, comprising:
a second throat,
a second input port connected to said second throat,
a third control port and a fourth control port connected to said second throat,
a third output port and a fourth output port extending from said second throat, a third feedback line connected to said third output port and said third control port and a fourth feedback line connected to said fourth output port and said fourth control port;

said plenum connected to said second input port to supply said control fluid to said second fluidic oscillator;

said first feedback chamber further disposed along said third feedback line to provide a feedback path for said control fluid to said second fluidic oscillator, wherein said first fluidic oscillator is in fluidic communication with said second fluidic oscillator through said first feedback chamber.

32. The system according to claim 31, wherein said first output port, said second output port, said third output port and said fourth output port are frequency locked with each other.

33. The system according to claim 32, wherein said frequency is tuned to a shedding frequency of vortices in a separated boundary layer of said main fluid flow.

34. The system according to claim 31, wherein said fluidic communication between said first oscillator and said second oscillator is configured to control a functional relationship between a supply pressure from an external source of said control fluid flow and said frequency.

35. The system according to claim 31, wherein said first oscillator and said second oscillator comprise passive oscillators.

36. The system according to claim 31, wherein said main fluid flow comprises a fluid flow downstream of a combustor.

37. The system according to claim 31, wherein said main fluid flows through at least one element selected from a group consisting of turbo machinery vanes and passages, engine components, fluidic logic circuitry, and any combination thereof.

38. The system according to claim 31, wherein said first oscillator and said second oscillator are configured to inhibit separation of a boundary layer of said main fluid flow.

39. The system according to claim 38, wherein said separation of the boundary layer is inhibited by addition of momentum to the boundary layer by means of said oscillating flow of said control fluid from said first, second, third and fourth output ports.

40. The system according to claim 39, wherein said addition of said momentum occurs at a point in said main fluid flow upstream of a separation point where said separation of said boundary layer of said main fluid flow would have occurred without said addition of momentum.

41. The system according to claim 38, wherein said separation of the boundary layer is inhibited through the unsteady mixing in the boundary layer by the oscillating flow of said control fluid.

42. The system according to claim 31, wherein said array of fluidic oscillators is positioned inside at least one element of an after-burning thrust augmenter selected from a group consisting of a flame holder, a heat shield, and any combination thereof.

43. The system according to claim 42, wherein said first oscillator and said second oscillator are configured to suppress combustion instabilities in a combustion zone within said at least one element.

44. The system according to claim 43, wherein said control fluid is air.

45. The system according to claim 44 further comprising a source of said air to supply said air into said plenum, wherein said source comprises at least one element selected from a group consisting of a compressor, a turbine, a turbine bypass, an auxiliary pump, and any combination thereof.

46. The system according to claim 45, wherein said source of said air is configured to control said flow of said air to achieve a predetermined air-to-fuel ratio in said combustion zone.

47. The system according to claim 46, wherein said predetermined air-to-fuel ratio facilitates reduction of lean-blowout of a flame in said combustion zone.

48. The system according to claim 46, wherein said predetermined air-to-fuel ratio facilitates reduction of emissions of noxious substances in an exhaust from said combustion zone.

49. The system according to claim 43, wherein orientations of said first output port, said second output port, said third output port and said fourth output port are configured to control a location of said combustion zone.

50. The system according to claim 43, wherein orientations of said first output port, said second output port, said third output port and said fourth output port are configured to control an extent of spread of said combustion zone.

51. The system according to claim 43 further configured to control circumferential and radial instability modes of combustion within said combustion zone.

* * * * *